Dec. 5, 1944.  A. A. BERNARD  2,364,507
ELECTRODE HOLDER FOR WELDING APPARATUS
Filed April 3, 1943  2 Sheets-Sheet 1
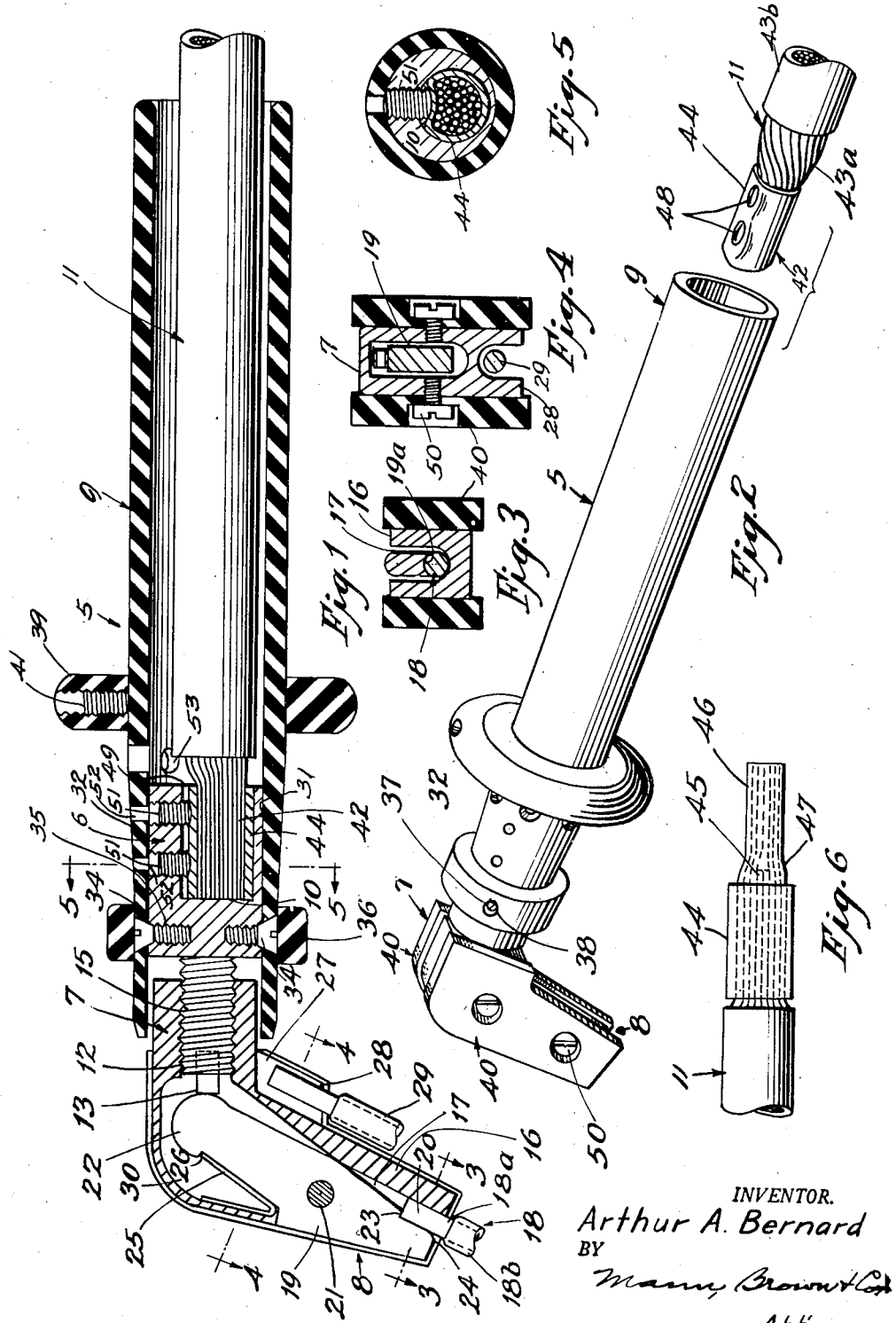
INVENTOR.
Arthur A. Bernard
BY
Manny Brown & Co
Att'y

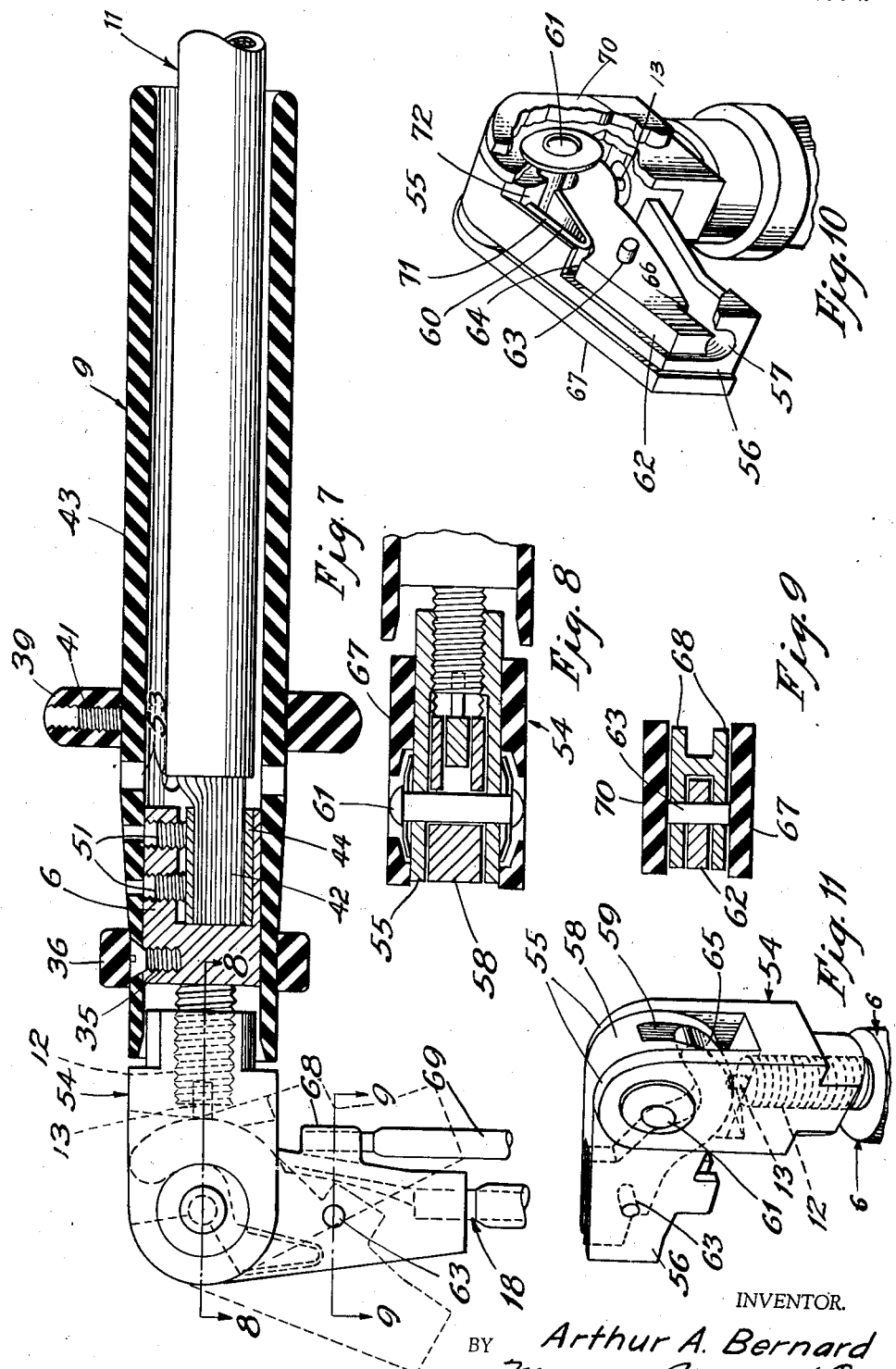

Patented Dec. 5, 1944

2,364,507

UNITED STATES PATENT OFFICE 2,364,507

ELECTRODE HOLDER FOR WELDING APPARATUS

Arthur A. Bernard, Chicago, Ill.

Application April 3, 1943, Serial No. 481,661

4 Claims. (Cl. 219—8)

This invention relates to welding apparatuses, and more particularly to devices employed in arc welding.

One of the principal objects of the invention is the provision of a new and improved welding electrode holder that is so constructed that it will hold the welding electrode in the most advantageous position for welding and for consuming a maximum length of the electrode during the welding operation.

Another object of the invention is the provision of new and improved welding electrode holders having novel jaw members for firmly holding the electrode, and that are of such shape that they are adapted to be used in numerous places and under various conditions.

A further object of the invention is the provision of a welding electrode holder of such construction as to have ample electrical conduction and efficient connections for eliminating, or at least reducing to a minimum, resistance heat within the holder mechanism.

A further object of the invention is the provision of a new and improved conductor cable holder construction, together with novel means of connecting the conductor to the holder with a minimum of time and effort.

Other objects of the invention are the provision of a new and improved welding electrode holder that is efficient in operation; inexpensive to manufacture; is composed of a minimum number of parts; is light and well balanced; is well insulated; and one in which the essential parts may be easily and readily removed or replaced.

Other and further objects and advantages of the invention will appear from the following description taken in connection with the accompanying drawings, in which Fig. 1 is a vertical section of the electrode holder;

Fig. 2 is a perspective view thereof, showing the conductor in position to be inserted in the holder;

Figs. 3, 4 and 5 are sections on the lines 3—3, 4—4 and 5—5, respectively, of Fig. 1;

Fig. 6 is a side elevation of the conductor at one stage in the manufacture of same;

Fig. 7 is a longitudinal section of a modified form of electrode holder;

Fig. 8 is a section on the line 8—8 of Fig. 7;

Fig. 9 is a section on the line 9—9 of Fig. 7;

Fig. 10 is a perspective view of the head and jaw construction of the holder, with parts broken away for the sake of clearness; and Fig. 11 is a perspective view of the outer end of the welding electrode head and jaw assembly.

It is well known in the industry that of the millions of pounds of electrodes manufactured and purchased each month in the United States there are thousands upon thousands of pounds of this manufactured material which is scrapped and never converted into the product for which it was manufactured to produce, viz: weld metal. The greater percentage of this loss of valuable steel and the alloying elements which go into its manufacture is due directly to inadequate electrode holder design, and exists mainly for the following two reasons: First, because of the design of electrode holders in present use, as the electrode becomes shorter due to its being melted away by the welding heat, the holders cannot be conveniently manipulated and lowered into the corners, the crevices and the pockets where many such seams to be welded are located. Therefore, that portion of the total length of each electrode which cannot be conveniently manipulated to reach such seams is discarded for scrap by the welding operator. The discarded portion of the electrode is referred to by the industry as being the electrode stub.

The second reason that thousands upon thousands of pounds of valuable electrode material is needlessly scrapped daily in the United States is because of resistance heating which develops in the welding electrode due in greater part to a poor and inefficient connection at the point where the electrode holder grips the welding electrode. When excessive, this resistance destroys the fusing characteristics of the electrode. When such resistance heating develops, the lowered efficiency is observed during welding by the welding operator, and the operator does one of two things, viz: either he continues to fuse the electrode and knowingly produces a low quality weld, or he discards long stub lengths and in this way scraps each day thousands of pounds of metal sorely needed for other purposes.

Briefly described, the reasons why the operating efficiency of an electrode is partly or completely destroyed when an excess of resistance heating develops in the electrode are as follows:

The action of how fused electrode metal fuses with molten base metal is greatly influenced by the temperature which the electrode reaches before the total usable length of the electrode is consumed. Depending on the analysis of the electrode, the harm resulting from such resistance heating varies. The general rule, however, is that the higher the temperature reached in the electrode before the electrode is totally consumed, the larger are the globules of electrode metal which transfer through the arc, and the greater is the rate of deposition for a considered current density. Such increased rates of deposition in turn proportionately reduce the efficiency of weld penetration into the base metal.

A still further reduction in weld quality which results from an excessive resistance heating of the electrode is for the reason that all brands of electrodes manufactured today have in the flux formulas for the coatings of the electrode surfaces compounds containing one or more of the following: free or crystalline water, carbon and carbohydrates. The purpose of these compounds is to emit a gas and thus shield the molten weld metal from the atmosphere during welding. However, if the end of the electrode which is gripped by the electrode holder becomes excessively heated, the gases intended for the welding zone are pre-released from the flux with the result that when this portion of the electrode reaches the arc oxidation of the molten weld metal takes place. As previously mentioned, these metal fusing and metal protecting deficiencies are observed by the operator, at which time either the operator continues welding and knowingly produces a low quality weld, or he discards excessive length stubs which are doomed to the scrap pile.

The same resistance heating referred to above, and responsible for the scrapping of tons upon tons of steel daily, also accounts for the scrapping of another product which today is even more valuable than electrode metal, viz: man power. Every one connected with the industry is aware of the fact that throughout the industry as a whole thousands upon thousands of man hours are lost each day because of the fact that in general the electrode holders in use become so highly overheated that the operators at numerous intervals throughout the day must stop operations to permit the holders to cool down. A small part of this overheated condition is unavoidably due to heat which radiates to the holder from the high temperature welding zone. However, the heat which raises the temperature of the holder to that degree which subjects the welding operator to agony and discomfort is the result of the same resistance heating which destroys electrodes.

The present invention seeks to eliminate or overcome these difficulties by providing an electrode holder that will permit a greater portion of each electrode to be converted into weld metal, thus proportionately reducing the length of discarded electrode stubs; and by providing a holder that will make available to the arc welding industry an electrode holder that will stay cool, and therefore save daily in the United States thousands upon thousands of man hours.

Within recent months our Government has requested all those in the industry to be more conservative with the steel allocated to the manufacture of welding electrodes, and to specially apply all possible economy practices to those electrodes which are alloyed with chromium and nickel. With such savings in mind some fabricators have adopted the practice of welding a short length of common steel rod to each length of alloy electrode, so that more of the total length of each electrode can be fed into the arc and thus be converted into weld metal. This newly applied practice is objectionable because it requires added time and man power. A study of the statistics will show that of the 500,000,000 pounds of electrodes manufactured annually in the United States 14% of this total poundage is scrapped in the form of discarded electrode stubs. If the length of electrode stubs now being discarded can be shortened by one more additional inch, approximately 42,000,000 pounds of electrode metal can be saved annually by the industry.

Primarily all resistance heating which develops in those holders which are at present available to the industry develops at the connection where the welding cable is attached to the holder, and/or at the connection where the holder grips the welding electrode.

The present invention seeks to remedy these defects by the provision of a terminal and holder having a minimum amount of resistance heating at these connection points.

Referring now to the drawings, the reference character 5 designates, generally, the electrode holder, which comprises a chassis, body portion or member 6 of electric conducting material, as copper or the like; a head portion 7; a clamping device 8; and a handle 9 of insulating material. The body portion 6 has, on what for convenience of description will be termed its inner end, an opening 10 for receiving and attaching a conductor 11, as will presently appear. Its outer end is provided with a reduced threaded portion 12, having a stud 13 of hard metal material fixed in an axial opening in the end of the same and extending outwardly beyond the end of the threaded portion 12 for engaging the movable jaw of the clamping device, as will presently appear.

The head portion 7 is of electric conducting material, and has an axial screw-threaded opening 15 in its inner end which is adapted to engage the reduced threaded portion 12, as clearly shown in Fig. 1 of the drawings. The clamping device 8 comprises a fixed jaw member 16 and a movable jaw member 19. The jaw member 16, in the form shown in Fig. 1, is integral with the head portion 7, and is channel shape in cross-section at its outer end, with the channel 17 opening outwardly, as shown in Fig. 3. The jaw member 16 is arranged, preferably though not necessarily, at an obtuse angle to the body portion, as shown in Fig. 1, and tapers toward its outer end so that in use the jaw member will occupy a minimum of space and offer a minimum obstruction to the movement of the holder in restricted spaces or under any conditions of use. It has been found in practice that if the fixed jaw 16 be arranged at an angle of about 110° from the body portion, satisfactory results are obtained.

The integral jaw portion 16 is tapered toward its free end and has the lower portion of the channel 17 curved so as to receive the exposed end of a welding rod or electrode 18 and form an extended contact therewith, as shown in Fig. 3. The welding rod or welding electrode 18 is of any suitable type, and comprises a core 18a of suitable metal or alloy, coated by a suitable composition 18b for generating a flux and/or a gas mantle for protecting the weld against oxidation during the welding operation. One end of the metal rod is exposed, as shown at 20 in Fig. 1, by means of which the rod is supported by the holder, as is usual in such constructions. Since the conventional electrode or welding rod is employed further description is unnecessary.

The movable jaw member 19 of the clamping device 8 is pivotally connected to the fixed jaw member 16, as at 21, and is positioned within the channel 17; and its inner end extends into a cavity or recess 30 within the head opposite the threaded opening 15. This cavity forms a housing for the inner end of the movable jaw 19 (see Fig. 1), and the wall over the cavity, together with the movable jaw and associated parts, protect the threaded portions from dust and dirt. The jaw 19 also tapers toward its outer end, and the latter is channeled, as at 19a (Fig. 3), for forming an extended contact with the welding electrode. Suitable means are provided for operating the movable jaw member for clamping the electrode or welding rod in position between the two jaw members 16 and 19.

In order that proper contact be made between the jaws and the electrode it is necessary that the means employed be capable of exerting considerable pressure for causing the jaws to grip the electrode. In the form of construction shown, which is by way of example only, the combination of screw and lever is employed for this purpose. As shown more clearly in Fig. 1, the inner end of the movable jaw member 19 is rounded, as at 22, and is adapted to be engaged by the pin or stud 13 on the outer end of the body member 6, so that by turning the handle the reduced threaded portion 12 screws into the head 7, causing the stud 13 to engage the rounded end 22 of the movable jaw to force the same outwardly for powerfully gripping the electrode 18. The outer end of the jaw 19 is provided with a shoulder 23, which limits the insertion of the rod 18 between the two jaws, as shown in Fig. 1.

If desired, the outer end of the movable jaw that engages the rod may be rounded or beveled, as at 24, for facilitating the insertion of the rod. The pivot pin 21 may be located at any convenient point, but preferably it is at such a point that sufficient leverage on the inner end of the movable jaw may be obtained for rigidly and firmly clamping the inner end of the electrode or welding rod with sufficient force to firmly hold the rod, and at the same time make such an electrical connection that resistance heat will not develop.

A U-shaped spring 25 is inserted between the inner end of the movable jaw 19 and the outer extension of the head 7 for normally resiliently holding the movable jaw in open position. The upper end of the movable jaw is provided with a shoulder 26 against which the spring may seat for holding the same in operative position. The head 7 may, if desired, be provided with a projection 27, having an opening 28 therein, which may extend in the direction of the fixed jaw, and is adapted to receive a wrench, spanner or lever 29 for holding the head while turning the handle for releasing the welding electrode.

In practice, the new electrode 18 that is to be substituted for the one consumed, or the stub, is inserted in the opening 28, as shown in Fig. 1, and is used as a lever for holding the head assembly while the handle is being unscrewed for releasing the stub of the rod 18, after which the new rod 18 is inserted between the jaws and the handle and turned to cause the jaws to grip the rod. This rod may also be grasped as a lever to hold the head while tightening the jaws.

The body portion 6 is provided with a suitable handle for holding and manipulating the electrode holder. As shown, a handle 9, of any suitable insulating material, is provided for this purpose. In the form of device selected to illustrate one embodiment of the invention, this handle member 9 is tubular in form and may be slightly tapered adjacent its forward end, as at 32, forming a reduced end portion. The outer end of the handle 9 is adapted to receive the chassis or body portion of the welder mechanism, and the same is held rigidly within the handle by means of suitable screws or other holding means, 34, that extend through openings in the handle and are threaded into corresponding openings 35 in the body portion of the welding rod holder.

In order to protect the operator against shock a suitable shield 36, of insulating material in the form of an annular member, is secured over the screws 34, the heads of which are flush with the surface of the handle, in any suitable manner, as by means of a set-screw 37 threaded into an opening 38 in the collar or shield 36 and engaging the handle. The outer end of the set-screw 37 is preferably below the surface of the collar or shield 36. An annular guard 39, of insulating material, is secured to the handle adjacent its outer end but spaced from the shield or collar 36, as shown in Fig. 1. This guard may be secured in position by a set-screw 41, the outer end of which is below the outer surface of the guard, as shown in said figure. This guard prevents the slippage of the hands of the operator onto the forward portion of the electrode holder.

Suitable means are provided for attaching the inner end or terminal 42 of the conductor 11 to the body portion 6. As shown in Figs. 2 and 6, the conductor 11 is formed of a core of wires 43a twisted together, and the insulating material 43b surrounds the same. A thin walled metal tube or ferrule 44, of copper or other suitable electric conducting material, is secured on the end of the wire core to form the terminal 42. In order to readily attach or secure the ferrule 44 to the inner end of the conductor, the outer ends of the wires at the center of the core are severed, as at 45, and removed, and the outer wires are then twisted together to form a reduced portion 46 (see Fig. 6), which may be readily inserted through the ferrule 44. The tapered portion 47 will guide the ferrule in proper position on the conductor. This ferrule is of such diameter that it is necessary to force the same onto the core, and after it is in position the outer end of the core is severed flush with the outer end of the ferrule.

After the terminal is inserted in the opening, bore or socket 10, the screws 51 are forced inwardly against the ferrule 44, thus flattening it and thereby reducing its cross-sectional area and simultaneously firmly clamping the wires of the core together. Furthermore, this pressure will indent the ferrule, as at 48, for holding it on the core, and will compel the lower curved surface of the terminal to conform to the curvature of the bore 10 for the greater portion of its extent, thus insuring an almost perfect electrical connection.

In attaching the conductor 11 to the body portion 6, the handle is slipped over the conductor a sufficient distance to expose the ferrule or terminal 42, after which the terminal is inserted in the socket or axial opening 10. The conductor is held in position by a pair of set-screws 51, which are adapted to engage the flat portion of the ferrule for clamping the same in position within the opening 49. The screws 51 may engage in the depressions 48, and, when tightened, assist in clamping the core within the terminal sleeve or ferrule 44. After the set-screws 51 are tightened the handle is slipped along the conductor in position over the body portion 6 onto the head 7.

The handle 9 is provided with openings 52 through which access to the screws 51 may be had when the parts are assembled for tightening these screws, or for releasing the conductor when it is desired to do so. The set-screws 51 are below the outer surface of the body portion, so that they may be retracted sufficiently to release the conductor without necessitating the removal of the handle 9. The openings 52 are of smaller diameter than the screws, so that it is impossible for either of the screws to become loose and extend to the surface of the handle, where they might become lost or constitute a hazard.

The handle between the screws 51 and the guard 39 is preferably provided with a plurality of openings 53 for permitting a circulation of air through this portion of the mechanism for cooling the same. If desired, plates of insulating material 40 may be secured to the sides of the integral jaw portion 16, as by means of screws 50 or other suitable fastening means, for insulating the head and jaw members.

In Figs. 7 to 11 a modified form of construction is shown, and in this form of device the jaw members are adjustably connected to the head portion whereby the welding rod or electrode may be arranged at any desired angle relative to the handle. In this form of construction the arrangement of the handle 9, body portion 6, shield 36, guard 39, and conductor 11, is substantially the same as that already described, and it is not thought necessary to repeat the description.

In this form of construction the head 54 is bifurcated at its outer end, as shown at 55 in Fig. 11. A rigid jaw member 56 has its outer portion provided with a groove or channel, as at 57 (Fig. 10), for receiving the welding rod, as will presently appear. The rear end 58 of the rigid jaw 56 is provided with a downwardly opening channel or recess 59 for receiving the rear end of a movable jaw, as shown in Fig. 11. The rear end 58 of the rigid jaw 56 is adapted to be pivoted to the head 54, as by means of the pivot 61, as shown more clearly in Fig. 8 of the drawings. A movable jaw 62 (Fig. 10) is provided for cooperating with the fixed jaw for clamping and holding a welding rod 18 at the outer ends of the jaws. The fixed and movable jaws taper toward their outer ends, as shown in Figs. 10 and 11.

The movable jaw 62 is pivoted to the fixed jaw, as by means of a suitable pivot 63, which is outwardly of the pivot 61 a sufficient distance to give the desired leverage for operating the movable jaw. The movable jaw has its inner end offset downwardly to form a shoulder 64 against which a U-shaped spring 60 seats. One arm, 71, of the U-shaped spring 60 seats against a shoulder 72 on the head 54. The inner end of the movable jaw is curved downwardly and inwardly, as at 65, beneath the pivot 61, and within the channel 59 in the head 54. The curved end 65 is provided with sufficient clearance beneath the pivot 61 so that when the movable jaw is in clamping position the end 65 will be spaced from the pivot 61 to give clearance for its movement. The movable jaw member, with its curved inner end, fits snugly within the channels 57 and 59 and constitutes closures for the channels, thereby excluding foreign matter therefrom.

Suitable means are provided for engaging the end 65 for operating the movable jaw and for simultaneously locking the jaw members at the desired adjusted angle about the head 54. As shown, the threaded extension 12 of the body portion 11 is provided with a hard metal pin 13, as in the previous construction, and the head 54 is provided with an interiorly screw-threaded opening for receiving the threaded extension 12, as previously described. The pin 13 is adapted to engage the end 65 of the movable jaw and force the same outwardly, as shown in Figs. 10 and 11, for clamping a welding electrode having its end between the two jaws.

The jaw 62 is provided with a shoulder 66 which limits the insertion of the welding electrode between the jaws. By turning the handle the threaded extension 12 is threaded into the head 54, thus causing the pin 13 to engage the end 65, forcing the same upward and clamping the welding rod in position. Upon further turning of the handle the two jaws, as a unit, will be forced outwardly, thus causing the fixed jaw to bind on the pivot 61 for holding the jaws in adjusted angular position.

Suitable insulating material 67 and 70 may be attached to opposite sides of the head and jaws, respectively, for insulating the same. The fixed jaw 56 may be provided on its under side with downwardly extending projections 68 between which a tool 69, such as the welding rod, may be inserted for holding the head while the handle is being rotated for releasing the clamping mechanism. The electrode, when inserted between the jaws, may itself be used as a lever for tightening the jaws for clamping the rod and for holding the head in adjusted position.

In both forms of construction, when it is desired to secure a welding electrode in position between the jaws the handle may be rotated to retract the threaded member 12 from the head for opening the jaws, after which the bared end of the electrode or welding rod is inserted, and then the head screwed back into position for causing the movable jaw member to clamp the electrode firmly against the stationary jaw member of the holder.

In the form of construction shown in Figs. 7 to 10, the jaw members are moved to the desired angular position and held there while the handle is rotated for clamping the parts in position. The heads 7 and 54 are interchangeable, and if desired other heads may be provided so that by replacing one head with another of a different angle or type, work of a different character may be done by simply replacing the head of the electrode holder by another of the desired angularity.

Some welders prefer that the rod be held at one angle and others at a different angle. Again, there are certain places where it is advantageous to have jaws arranged at a different angle from the conventional, as where the weld is not easily accessible. In such cases the heads may be exchanged for others having jaws of longer or shorter lengths, or of different contours, or for those arranged at the most advantageous angles; or the angularity of the jaws may be adjusted if the head shown in Figs. 7 to 10 be employed.

It will be noted that in each form of construction the fixed jaw, being in channel form, will limit the diameter of the rod that may be used. The amperage capacity of the construction is designed for the largest diameter rod that may be used, so there is under no condition overloading by the electric current. This is considered an important feature of the invention.

Furthermore, the length of the ferrule and its extent of contact with the body portion 6 is so extensive that the electrical resistance at this point is at a minimum, and as a result there is little or no electrical resistance heating at this point.

Furthermore, in plants that work from two to three shifts every twenty-four hours, it is not unusual for each welder to use a certain welding head assigned to him, to the exclusion of any one else. In that event each welder is supplied with a head and jaw assembly, and when his shift terminates he removes the assembly from the handle and body portion, and the operator taking over attaches to the welding rod holder a head and jaw assembly that has been assigned to him, whereby each operator is personally responsible for the condition of the welder head assembly assigned to him.

If it is desired to remove the conductor from the handle, all that is necessary is to release the screws 51, after which the conductor may be removed from the handle. If it is desired to have access to the body portion of the electrode holder the shield 36 is released and slid from over the screws 35, after which the screws may be taken out and the handle portion removed by unscrewing the handle member from the head portion of the holder.

While the description is directed to the forms of construction shown, it is understood that this is by way of example only, and that the claims are to be limited only as necessitated by the state of the art.

It is thought from the foregoing, taken in connection with the accompanying drawings, that the construction and operation of my device will be apparent to those skilled in the art, and that changes in size, shape, proportion or detail may be made without departing from the spirit and scope of the appended claims.

I claim as my invention:

1. In an electrode holder, a body portion, means for connecting a conductor to said body portion, a head comprising an inner portion aligned with the body portion and having a first jaw extending at an inclination therefrom, a second jaw pivoted between its ends to the first jaw for cooperating therewith to hold an electrode, and means including a screw formed on the body portion and threaded into the inner portion of the head for connecting the head and body portions together and engaging the inner end of the second jaw to move the same about said pivot for causing said jaws to grip an electrode.

2. In an electric welding electrode holder, a welding head having a rigid jaw, a movable jaw pivotally connected between its ends to said rigid jaw, said head having a screw-threaded axial opening in its inner end, said head having a recess therein opposite said opening for receiving the inner end of said movable jaw.

3. In an electrode holder for an electric welding apparatus, a head portion having an axial threaded opening in one end and having a rigid jaw extending outwardly from said head at an obtuse angle to the axis of said opening, said jaw tapering toward its free end and having a channel extending longitudinally thereof, a movable jaw pivoted between its ends within said channel and tapered outwardly, the inner end of said movable jaw extending across the axis of said opening and adapted to be operated by a member extending into said opening.

4. In an electrode holder for a welding apparatus, a body portion having an outwardly extending projection, a handle for said body portion, means for connecting an electric conductor to said body portion, a head member threaded on said projection, said head member being bifurcated at its outer end, a rigid jaw pivoted between the furcations of said head and having a channel on each end facing in opposite directions, a movable jaw housed within said head with its outer end in one channel and its inner end in another of said channels for closing the channels against the entrance of foreign matter, means to pivot the movable jaw to the rigid jaw adjacent the outer end of the latter so that the movable jaw will be housed in said channels, the inner end of said movable jaw being curved to extend partly around the pivot in said head opposite said projection whereby when said projection is screwed into said head it will engage the curved end of said movable jaw for simultaneously clamping an electrode between said jaws and for locking said jaws in adjusted angular position on said head.

ARTHUR A. BERNARD.